US012034230B1

(12) United States Patent
Tang et al.

(10) Patent No.: US 12,034,230 B1
(45) Date of Patent: Jul. 9, 2024

(54) ALL-METAL DUAL-POLARIZED FEEDING ELEMENT AND ALL-METAL DUAL-POLARIZED PANEL ANTENNA

(71) Applicant: China Starwin Science & Technology Co., Ltd, Chengdu (CN)

(72) Inventors: Haijun Tang, Chengdu (CN); Xiaoyong Zeng, Chengdu (CN); Lianhui Peng, Chengdu (CN); Xuebing Jiang, Chengdu (CN); Songlin Li, Chengdu (CN)

(73) Assignee: CHINA STARWIN SCIENCE & TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 18/208,321

(22) Filed: Jun. 12, 2023

(30) Foreign Application Priority Data

Apr. 4, 2023 (CN) ........................ 202310350676.2

(51) Int. Cl.
*H01Q 5/55* (2015.01)
*H01Q 21/24* (2006.01)

(52) U.S. Cl.
CPC ............... *H01Q 5/55* (2015.01); *H01Q 21/24* (2013.01)

(58) Field of Classification Search
CPC ................................ H01Q 21/24; H01Q 5/55
See application file for complete search history.

*Primary Examiner* — Graham P Smith
(74) *Attorney, Agent, or Firm* — Bayramoglu Law Offices LLC

(57) ABSTRACT

An all-metal dual-polarized feeding element and an all-metal dual-polarized panel antenna are provided. According to the present disclosure, a first metal plate and M*N same waveguide radiating ports on the first metal plate form a radiating network. A second metal plate, a third metal plate, a fourth metal plate, a quadruple-ridged waveguide array, a first polarization feeding network, a second polarization feeding network, a coaxial to double-ridged waveguide array, and a double-ridged waveguide to quadruple-ridged waveguide array form a feeding network. Therefore, the dual-polarized feeding element and the dual-polarized panel antenna realize a wide bandwidth, a high efficiency and a low profile. The present disclosure solves problems of poor performance and hard realization of existing dual-polarized antennas in wide bandwidth, high efficiency and low profile.

17 Claims, 8 Drawing Sheets

ALL-METAL DUAL-POLARIZED FEEDING ELEMENT AND ALL-METAL DUAL-POLARIZED PANEL ANTENNA

CROSS REFERENCE TO THE RELATED APPLICATIONS

This application is based upon and claims priority to Chinese Patent Application No. 202310350676.2, filed on Apr. 4, 2023, the entire contents of which are incorporated herein by reference.

TECHNICAL FIELD

The present disclosure belongs to the technical field of communication, and in particular to an all-metal dual-polarized feeding element and an all-metal dual-polarized panel antenna.

BACKGROUND

Compared with two separate single-polarized antennas, dual-polarized antennas can save the cost and space for wireless communication systems. At present, dual-polarized antennas play a vital role in wireless communication systems. Since all-metal dual-polarized antennas eliminate dielectric loss and have characteristics of high gain and high efficiency, there is a growing demand for them in remote wireless communication scenarios, such as high-rate point-to-point wireless communication and satellite communication.

Parabolic antennas are commonly selected for their low cost and simple structure in design of the all-metal dual-polarized antennas. However, due to large sizes, parabolic antennas are hard to realize low profiles.

A broadband dual-circularly-polarized planar waveguide array antenna is provided in the prior art. The antenna includes a radiation aperture, a resonant cavity, a feeding square waveguide, a circular polarizer, a dual-polarization feeding network, and a standard waveguide transition interface that are stacked sequentially from top to bottom. The central bandwidth is very narrow and is only 16%, and the antenna efficiency is about 60%. Because of the circular polarizer, the overall profile is high.

A dual-polarized transmitting-receiving waveguide array antenna is provided in the prior art. The antenna sequentially includes a radiating waveguide horn, a vertically polarized waveguide feeding network, a horizontally polarized waveguide feeding network, and an orthogonal mode converter from top to bottom. Although the antenna has a high overall efficiency, its operation bandwidth is narrow. Due to the orthogonal mode converter, the overall contour height is not as desired, and the profile is also high.

A broadband dual-polarized waveguide array antenna is provided in the prior art. Two polarizers use a suspended dielectric strip line for feeding, so the antenna has a compact structure and a low profile. However, due to reflective matching of a back cavity of a lower polarizer, the differential loss between upper and lower sidebands is large. Because of coupling and excitation of a single-sided probe of an upper polarizer, phase centers of radiating elements are asymmetric to lower a spatial combining efficiency of the antenna. An upper 2*2 subarray feeding network has a small space. For the sake of wiring, a channel isolation wall is removed to cause coupling. Consequently, the radiating element in the upper polarizer cannot realize constant-amplitude cophase excitation to cause an asymmetric radiation pattern of the antenna. This further exacerbates an aperture efficiency on the front of the antenna. Therefore, the antenna has the hard reflective matching, poor standing wave and undesired aperture efficiency.

The above dual-polarized antennas hardly realize the wide bandwidth, high efficiency and low profile concurrently, and their performance can still be improved.

SUMMARY

In view of shortages in the prior art, the present disclosure provides an all-metal dual-polarized feeding element and an all-metal dual-polarized panel antenna, to solve problems of low performance, and hard realization of existing dual-polarized antennas in wide bandwidth, high efficiency and low profile.

To achieve the above objective, the present disclosure adopts the following technical solutions.

The present disclosure provides an all-metal dual-polarized feeding element, including a quadruple-ridged waveguide combiner, a double-ridged waveguide to quadruple-ridged waveguide converter, and a coaxial to double-ridged waveguide converter that are stacked sequentially from top to bottom and are coupled, where the quadruple-ridged waveguide combiner is a step tapered structure in size from top to bottom; the quadruple-ridged waveguide combiner can transmit electromagnetic waves in dual polarization directions; and the double-ridged waveguide to quadruple-ridged waveguide converter and the coaxial to double-ridged waveguide converter transmit an electromagnetic wave in a same single polarization direction for the electromagnetic waves in the dual polarization directions.

The present disclosure has the following beneficial effects: Since an all-metal structure is used, and both a coaxial to double-ridged waveguide array and a double-ridged waveguide to quadruple-ridged waveguide array have a wide bandwidth, the wide bandwidth and the high efficiency are achieved. In addition, since devices with a large height such as an orthogonal mode converter are omitted, the overall height is small and the profile is low. Therefore, the present disclosure can achieve a wide bandwidth, a high efficiency and a low profile.

Further, the quadruple-ridged waveguide combiner is an integrally formed structure; or the quadruple-ridged waveguide combiner is a separated structure.

The above further solution has the following beneficial effects: By providing the quadruple-ridged waveguide combiner as either the integrally formed structure or the separated structure, the present disclosure can improve a flexibility of the design and a scenario expansion capability of the product.

Further, in response to the separated structure, the quadruple-ridged waveguide combiner includes a plurality of quadruple-ridged waveguide structural components that are stacked sequentially and are independent; and a periphery size of an uppermost first quadruple-ridged waveguide structural component is greater than a periphery size of a lowest second quadruple-ridged waveguide structural component; a bottom of the second quadruple-ridged waveguide structural component comes in contact with a top of the double-ridged waveguide to quadruple-ridged waveguide converter; and a bottom size of the second quadruple-ridged waveguide structural component is matched with a top size of the double-ridged waveguide to quadruple-ridged waveguide converter.

The above further solution has the following beneficial effects: Since the quadruple-ridged waveguide structural components are tapered in a step manner from top to bottom, the present disclosure can effectively reduce the profile.

Further, the quadruple-ridged waveguide structural components each include a lower input port and an upper output port, and an input port of an upper quadruple-ridged waveguide structural component is docked with an output port of an adjacent lower quadruple-ridged waveguide structural component;

an output port of the uppermost first quadruple-ridged waveguide structural component serves as a first output port of the quadruple-ridged waveguide combiner, and the first output port serves as an output port of the all-metal dual-polarized feeding element; and a first input port of the quadruple-ridged waveguide combiner is provided on a sidewall between two ridges of the lowest second quadruple-ridged waveguide structural component; an input port of the lowest second quadruple-ridged waveguide structural component serves as a second input port of the quadruple-ridged waveguide combiner; and a phase difference between polarization directions of the first input port and the second input port is 90°.

The above further solution has the following beneficial effects: The present disclosure can realize input coupling in two polarization directions at different heights, and unnecessarily inputs electromagnetic waves in dual polarization directions in a same plane. Therefore, design requirements on the feeding element are reduced, and a depolyable number of antenna elements in a unit area of the panel antenna is increased.

Further, the double-ridged waveguide to quadruple-ridged waveguide converter includes an upper third quadruple-ridged waveguide structural component and a lower first double-ridged waveguide structural component; and the third quadruple-ridged waveguide structural component and the first double-ridged waveguide structural component are stacked and coupled; a top of the third quadruple-ridged waveguide structural component comes in contact with the bottom of the second quadruple-ridged waveguide structural component; and the first double-ridged waveguide structural component is coupled with the coaxial to double-ridged waveguide converter.

The above further solution has the following beneficial effects: With the double-ridged waveguide to quadruple-ridged waveguide converter, the present disclosure can transmit the electromagnetic wave in the second polarization direction at the wide bandwidth, the low loss and the high efficiency.

Further, the first double-ridged waveguide structural component is a dumbbell-like waveguide structure; a size of each of first end waveguide components at two ends of the first double-ridged waveguide structural component is greater than a size of a first middle waveguide structural component at a middle of the first double-ridged waveguide structural component; and the first end waveguide components at the two ends of the first double-ridged waveguide structural component are coupled with the first middle waveguide structural component at the middle of the first double-ridged waveguide structural component.

The above further solution has the following beneficial effects: With the double-ridged waveguide to quadruple-ridged waveguide converter, the present disclosure can transmit the electromagnetic wave in the second polarization direction at the wide bandwidth, the low loss and the high efficiency.

Further, the coaxial to double-ridged waveguide converter includes a second double-ridged waveguide structural component morphologically matched and coupled with the first double-ridged waveguide structural component, and a coaxial input waveguide coupled with the second double-ridged waveguide structural component; and a third input port and a second output port having a greater size than the third input port are arranged on the coaxial input waveguide; and the second output port is coupled with a side of the second double-ridged waveguide structural component.

The above further solution has the following beneficial effects: With the coaxial to double-ridged waveguide converter, the present disclosure can transmit the electromagnetic wave in the second polarization direction at the wide broadband, the low loss and the high efficiency.

Further, ridges of the quadruple-ridged waveguide combiner, the double-ridged waveguide to quadruple-ridged waveguide converter, and the coaxial to double-ridged waveguide converter are a chamfer, and use an all-metal structure.

The above further solution has the following beneficial effects: Each ridge is the chamfer, so the mode field distribution is more uniform. With the all-metal structure, the present disclosure achieves the wide bandwidth and the high efficiency.

The present disclosure provides an all-metal dual-polarized panel antenna, including a radiating network and a feeding network that are stacked sequentially from top to bottom;

the radiating network includes a first metal plate and a waveguide radiating port array on the first metal plate; the waveguide radiating port array includes M*N same waveguide radiating ports; and the M*N same waveguide radiating ports are distributed uniformly at intervals in M rows and N columns to form the waveguide radiating port array, where M and N denote an integer greater than or equal to 2, and * denotes a multiplicative operator;

the feeding network includes a second metal plate, a third metal plate, a fourth metal plate, a first polarization feeding network on the second metal plate, a second polarization feeding network on the fourth metal plate, and the M*N same all-metal dual-polarized feeding elements; and the M*N same all-metal dual-polarized feeding elements form a quadruple-ridged waveguide array, a double-ridged waveguide to quadruple-ridged waveguide array, and a coaxial to double-ridged waveguide array; and the quadruple-ridged waveguide array is provided on the second metal plate; the quadruple-ridged waveguide array includes M*N same quadruple-ridged waveguide combiners; the M*N quadruple-ridged waveguide combiners are distributed uniformly at intervals in M rows and N columns; the double-ridged waveguide to quadruple-ridged waveguide array is provided on the third metal plate; the double-ridged waveguide to quadruple-ridged waveguide array includes M*N same double-ridged waveguide to quadruple-ridged waveguide converters; the M*N double-ridged waveguide to quadruple-ridged waveguide converters are distributed uniformly at intervals in M rows and N columns; the coaxial to double-ridged waveguide array is provided on the fourth metal plate; the coaxial to double-ridged waveguide array includes M*N same coaxial to double-ridged waveguide converters; and the M*N coaxial to double-ridged waveguide converters are distributed uniformly at intervals in M rows and N columns.

The present disclosure has the following beneficial effects: Since an all-metal structure is used, and the feeding network structure composed of the first polarization feeding network, the second polarization feeding network, the coaxial to double-ridged waveguide array and the double-ridged waveguide to quadruple-ridged waveguide array has a wide bandwidth, the wide bandwidth and the high efficiency are achieved. In addition, since devices with a high height such as an orthogonal mode converter are omitted, the overall height is small and the profile is low. Therefore, the present disclosure can achieve a wide bandwidth, a high efficiency and a low profile.

Further, the first polarization feeding network includes a first one-to-M*N power divider; a fourth input port and M*N third output ports are arranged on the first one-to-M*N power divider; the M*N third output ports face a first direction; and the M*N third output ports are coupled with first input ports of the M*N quadruple-ridged waveguide combiners in one-to-one correspondence; and the second polarization feeding network includes a second one-to-M*N power divider; a fifth input port and M*N fourth output ports are arranged on the second one-to-M*N power divider; the M*N fourth output ports face a second direction; and the M*N fourth output ports are coupled with third input ports of the M*N coaxial to double-ridged waveguide converters in one-to-one correspondence.

The above further solution has the following beneficial effects: The present disclosure can realize input coupling in two polarization directions at different heights, and unnecessarily inputs electromagnetic waves in dual polarization directions in a same plane. Therefore, design requirements on the feeding element are reduced, and the arrangement difficulty for the polarized feeding networks is lowered.

Figure 1:
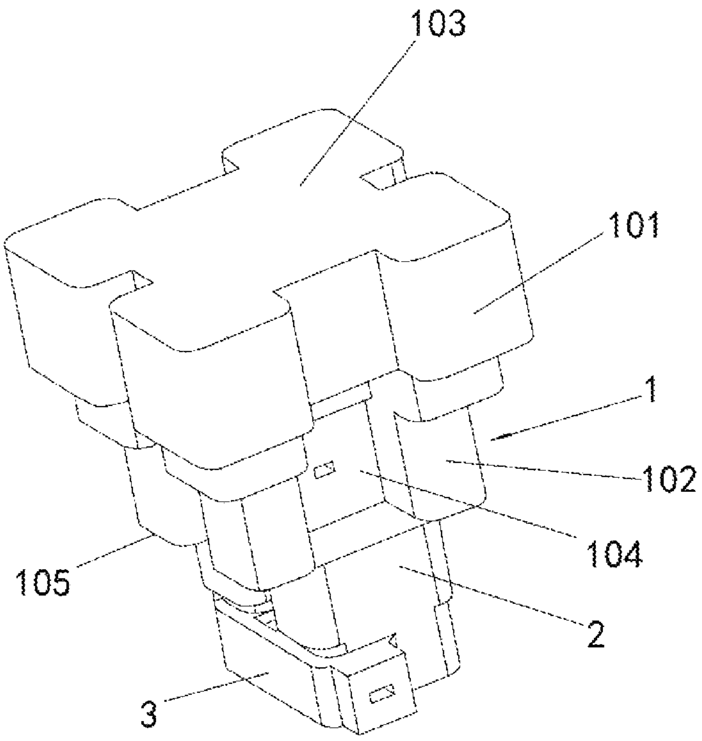
FIG. 1 is an oblique view of an overall structure of an all-metal dual-polarized feeding element according to the present disclosure.

In the figures: 1—quadruple-ridged waveguide combiner, 101—first quadruple-ridged waveguide structural component, 102—second quadruple-ridged waveguide structural component, 103—first output port, 104—first input port, 105—second input port, 2—double-ridged waveguide to quadruple-ridged waveguide converter, 201—third quadruple-ridged waveguide structural component, 202—first double-ridged waveguide structural component, 2021—first end waveguide component, 2022—first middle waveguide structural component, 3—coaxial to double-ridged waveguide converter, 301—second double-ridged waveguide structural component, 302—coaxial input waveguide, 3021—third input port, 3022—second output port, 4—first metal plate, 5—waveguide radiating port, 6—second metal plate, 7—third metal plate, 8—fourth metal plate, 9—first polarization feeding network, 901—fourth input port, 902—third output port, 903—first-stage first polarization one-to-two power divider, 904—second-stage first polarization one-to-two power divider, 905—third-stage first polarization one-to-two power divider, 906—fourth-stage first polarization one-to-two power divider, 907—fifth-stage first polarization one-to-two power divider, 10—second polarization feeding network, 1001—fifth input port, 1002—fourth output port, 1003—first-stage second polarization one-to-two power divider, 1004—second-stage second polarization one-to-two power divider, 1005—third-stage second polarization one-to-two power divider, 1006—fourth-stage second polarization one-to-two power divider, 1007—fifth-stage second polarization one-to-two power divider, and 1008—sixth-stage second polarization one-to-two power divider.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Embodiment 1

As shown in FIG. 1 to FIG. 5, the present disclosure provides an all-metal dual-polarized feeding element, which is used to realize transmission in dual polarization modes at a high efficiency, a wide bandwidth and a low profile. The all-metal dual-polarized feeding element includes quadruple-ridged waveguide combiner 1, double-ridged waveguide to quadruple-ridged waveguide converter 2, and coaxial to double-ridged waveguide converter 3 that are stacked sequentially from top to bottom and are coupled.

The quadruple-ridged waveguide combiner 1 is a step tapered structure in size from top to bottom. The quadruple-ridged waveguide combiner 1 can transmit electromagnetic waves in dual polarization directions. The double-ridged waveguide to quadruple-ridged waveguide converter 2 and the coaxial to double-ridged waveguide converter 3 transmit an electromagnetic wave in a same single polarization direction for the electromagnetic waves in the dual polarization directions. The quadruple-ridged waveguide combiner 1 is an integrally formed structure; or the quadruple-ridged waveguide combiner 1 is a separated structure.

In the embodiment, in response to the separated structure, the quadruple-ridged waveguide combiner 1 includes a plurality of quadruple-ridged waveguide structural components that are stacked sequentially and are independent. A periphery size of uppermost first quadruple-ridged waveguide structural component 101 is greater than a periphery size of lowest second quadruple-ridged waveguide structural component 102. A bottom of the second quadruple-ridged waveguide structural component 102 comes in contact with a top of the double-ridged waveguide to quadruple-ridged waveguide converter 2. A bottom size of the second quadruple-ridged waveguide structural component 102 is matched with a top size of the double-ridged waveguide to quadruple-ridged waveguide converter 2.

In the embodiment, the quadruple-ridged waveguide structural components each include a lower input port and an upper output port. An input port of an upper quadruple-ridged waveguide structural component is docked with an output port of an adjacent lower quadruple-ridged waveguide structural component. An output port of the uppermost first quadruple-ridged waveguide structural component 101 serves as first output port 103 of the quadruple-ridged waveguide combiner 1, and the first output port 103 serves as an output port of the all-metal dual-polarized feeding element. First input port 104 of the quadruple-ridged waveguide combiner 1 is provided on a sidewall between two ridges of the lowest second quadruple-ridged waveguide structural component 102. An input port of the lowest second quadruple-ridged waveguide structural component 102 serves as second input port 105 of the quadruple-ridged waveguide combiner 1. A phase difference between polarization directions of the first input port 104 and the second input port 105 is 90°.

In the embodiment, in response to the integrally formed structure, an output port of uppermost first quadruple-ridged waveguide structural component 101 serves as first output port 103 of the quadruple-ridged waveguide combiner 1. First input port 104 of the quadruple-ridged waveguide combiner 1 is provided on a sidewall between two ridges of lowest second quadruple-ridged waveguide structural component 102.

In the embodiment, the double-ridged waveguide to quadruple-ridged waveguide converter 2 includes upper third quadruple-ridged waveguide structural component 201 and lower first double-ridged waveguide structural component 202.

The third quadruple-ridged waveguide structural component 201 and the first double-ridged waveguide structural component 202 are stacked and coupled. A top of the third quadruple-ridged waveguide structural component 201 comes in contact with the bottom of the second quadruple-ridged waveguide structural component 102. The first double-ridged waveguide structural component 202 is coupled with the coaxial to double-ridged waveguide converter 3.

In the embodiment, the first double-ridged waveguide structural component 202 is a dumbbell-like waveguide structure. A size of each of first end waveguide components 2021 at two ends of the first double-ridged waveguide structural component 202 is greater than a size of first middle waveguide structural component 2022 at a middle of the first double-ridged waveguide structural component. The first end waveguide components 2021 at the two ends of the first double-ridged waveguide structural component are coupled with the first middle waveguide structural component 2022 at the middle of the first double-ridged waveguide structural component.

In the embodiment, the coaxial to double-ridged waveguide converter 3 includes second double-ridged waveguide structural component 301 morphologically matched and coupled with the first double-ridged waveguide structural component 202, and coaxial input waveguide 302 coupled with the second double-ridged waveguide structural component 301.

Third input port 3021 and second output port 3022 having a greater size than the third input port 3021 are arranged on the coaxial input waveguide 302. The second output port 3022 is coupled with a side of the second double-ridged waveguide structural component 301.

In the embodiment, ridges of the quadruple-ridged waveguide combiner 1, the double-ridged waveguide to quadruple-ridged waveguide converter 2, and the coaxial to double-ridged waveguide converter 3 are a chamfer, and use an all-metal structure.

In the embodiment, the all-metal dual-polarized feeding element includes quadruple-ridged waveguide combiner 1, double-ridged waveguide to quadruple-ridged waveguide converter 2, and coaxial to double-ridged waveguide converter 3 that are stacked sequentially from top to bottom and are coupled. The quadruple-ridged waveguide combiner 1 can transmit electromagnetic waves in dual polarization directions. The double-ridged waveguide to quadruple-ridged waveguide converter 2 and the coaxial to double-ridged waveguide converter 3 only transmit an electromagnetic wave in a single polarization direction for the electromagnetic waves in the dual polarization directions.

Figure 2:
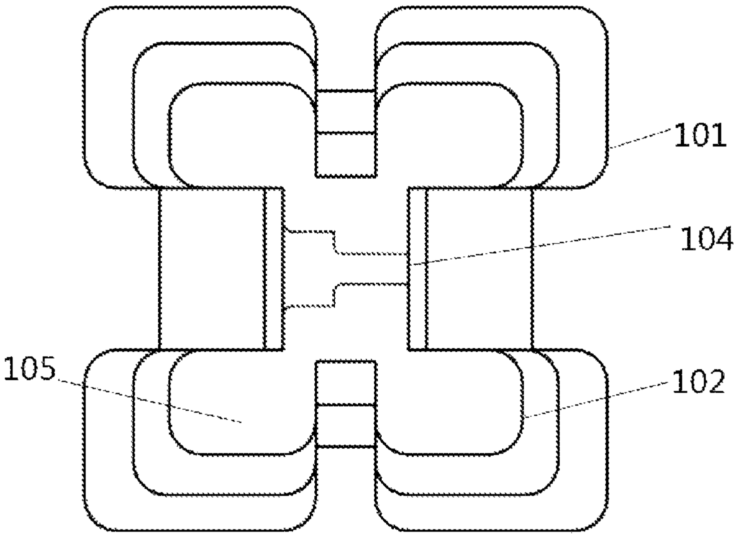
FIG. 2 is a bottom view of a quadruple-ridged waveguide combiner according to the present disclosure.

In the embodiment, as shown in FIG. 1 to FIG. 2, the quadruple-ridged waveguide combiner 1 includes upper first quadruple-ridged waveguide structural component 101 and lower second quadruple-ridged waveguide structural component 102. From top to bottom, a projection size of the first quadruple-ridged waveguide structural component 101 is greater than a projection size of the second quadruple-ridged waveguide structural component 102. In other words, the quadruple-ridged waveguide combiner 1 is a step tapered structure in size from top to bottom. A bottom of the second quadruple-ridged waveguide structural component 102 comes in contact with a top of the double-ridged waveguide to quadruple-ridged waveguide converter 2. A bottom size of the second quadruple-ridged waveguide structural component 102 is matched with a top size of the double-ridged waveguide to quadruple-ridged waveguide converter 2. Through the quadruple-ridged waveguide combiner 1, the profile can be effectively reduced.

In the embodiment, the quadruple-ridged waveguide combiner 1 may be an integrally formed structure, and may also be a combined structure. In other words, in response to the integrally formed structure, the upper first quadruple-ridged waveguide structural component 101 and the lower second quadruple-ridged waveguide structural component 102 are integrally formed. In response to the combined structure, the upper first quadruple-ridged waveguide structural component 101 and the lower second quadruple-ridged waveguide structural component 102 are separated and independent components. In response to the combined structure, an uppermost quadruple-ridged waveguide in a plurality of independent quadruple-ridged waveguides serves as the first quadruple-ridged waveguide structural component 101, and a lowest quadruple-ridged waveguide serves as the second quadruple-ridged waveguide structural component 102. Therefore, a flexibility of the design and a scenario expansion capability of the product can be improved.

In the embodiment, as shown in FIG. 1 to FIG. 2, the quadruple-ridged waveguide combiner 1 includes first input port 104, second input port 105, and first output port 103. The first output port 103 serves an output port of the whole all-metal dual-polarized feeding element, and is configured to output a polarized signal of a wide bandwidth and a high gain. The first input port 104 is provided on a sidewall between two ridges of the lower second quadruple-ridged waveguide structural component 102 of the quadruple-ridged waveguide combiner 1. Preferably, an opening is formed in the sidewall between the two ridges of the lower second quadruple-ridged waveguide structural component 102. The opening serves as the first input port 104 of the quadruple-ridged waveguide combiner 1.

In the embodiment, the first input port 104 is configured to receive an electromagnetic wave in a first polarization direction. The second input port 105 is configured to receive an electromagnetic wave in a second polarization direction. A phase difference between the first polarization direction and the second polarization direction is 90°. For example, the first polarization direction refers to a horizontal polarization direction, while the second polarization direction refers to a vertical polarization direction. Alternatively, the first polarization direction refers to a vertical polarization direction, while the second polarization direction refers to a horizontal polarization direction. Alternatively, the first polarization direction refers to a right-handed polarization direction, while the second polarization direction refers to a left-handed polarization direction. Alternatively, the first polarization direction refers to a left-handed polarization direction, while the second polarization direction refers to a right-handed polarization direction.

Figure 3:
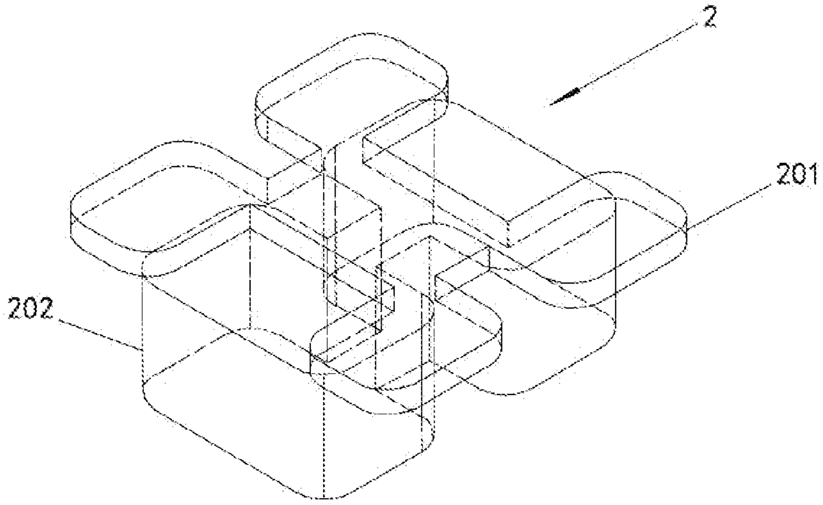
FIG. 3 is an oblique perspective view of a double-ridged waveguide to quadruple-ridged waveguide converter according to the present disclosure.
Figure 4:
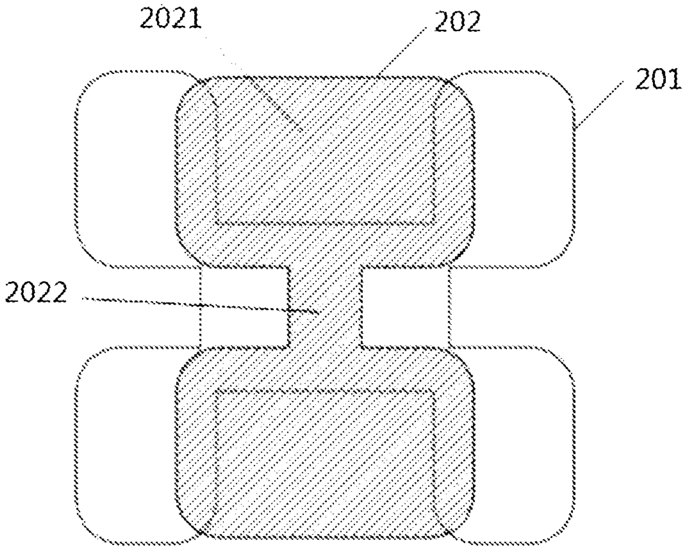
FIG. 4 is a bottom view of a double-ridged waveguide to quadruple-ridged waveguide converter according to the present disclosure.

In the embodiment, as shown in FIG. 3 to FIG. 4, the double-ridged waveguide to quadruple-ridged waveguide converter 2 includes upper third quadruple-ridged waveguide structural component 201 and lower first double-ridged waveguide structural component 202. The third quadruple-ridged waveguide structural component 201 and the first double-ridged waveguide structural component 202 are stacked and coupled. The first double-ridged waveguide structural component 202 is a dumbbell-like waveguide structure. First end waveguide structural components 2021 at two ends of the first double-ridged waveguide structural component are large, while first middle waveguide structural component 2022 at a middle of the first double-ridged waveguide structural component is small. The first end waveguide structural components 2021 at the two ends of the first double-ridged waveguide structural component are coupled with the first middle waveguide structural component 2022 at the middle of the first double-ridged waveguide structural component. Therefore, the double-ridged waveguide to quadruple-ridged waveguide converter 2 can transmit the electromagnetic wave in the second polarization direction at the wide bandwidth, low loss and high efficiency.

Figure 5:
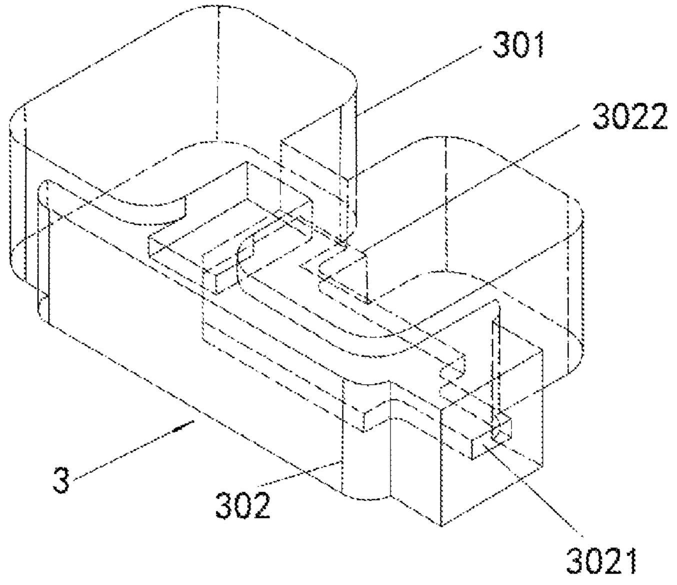
FIG. 5 is an oblique perspective view of a coaxial to double-ridged waveguide converter according to the present disclosure.

In the embodiment, as shown in FIG. 5, the coaxial to double-ridged waveguide converter 3 includes second double-ridged waveguide structural component 301 morphologically matched and coupled with the first double-ridged waveguide structural component 202 of the double-ridged waveguide to quadruple-ridged waveguide converter 2, and coaxial input waveguide 302 coupled with the second double-ridged waveguide structural component 301. Third input port 3021 of the coaxial input waveguide 302 has a smaller size than second output port 3022. The second output port 3022 of the coaxial input waveguide 302 is coupled with a side of the second double-ridged waveguide structural component 301. Therefore, the coaxial to double-ridged waveguide converter 3 can transmit the electromagnetic wave in the second polarization direction at the wide bandwidth, low loss and high efficiency.

In the embodiment, the all-metal dual-polarized feeding element provided by the present disclosure can serve as an antenna array element to construct a dual-polarized panel antenna. Thus, the all-metal dual-polarized panel antenna with a wide bandwidth, a high efficiency and a low profile is realized.

Embodiment 2

Figure 6:
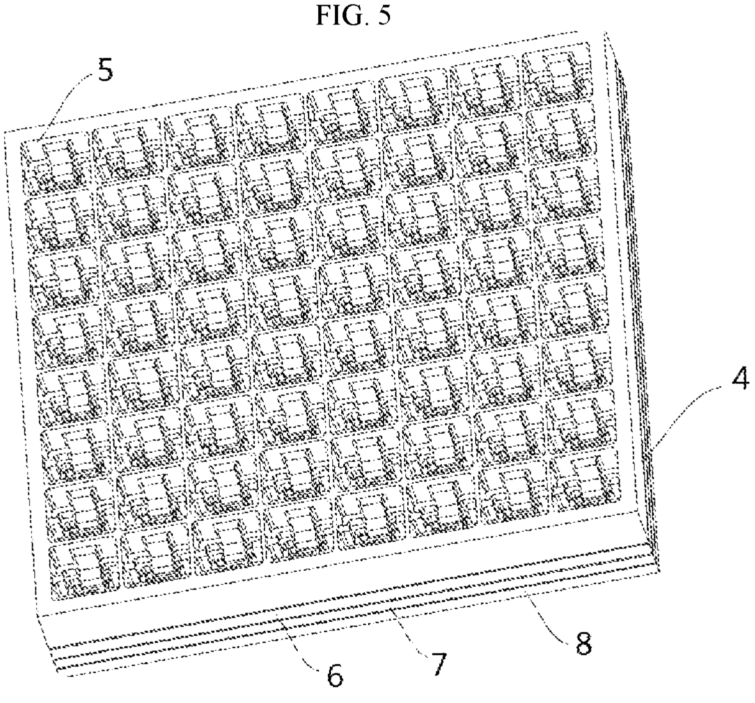
FIG. 6 is an oblique view of an overall structure of an all-metal dual-polarized panel antenna according to the present disclosure.
Figure 7:
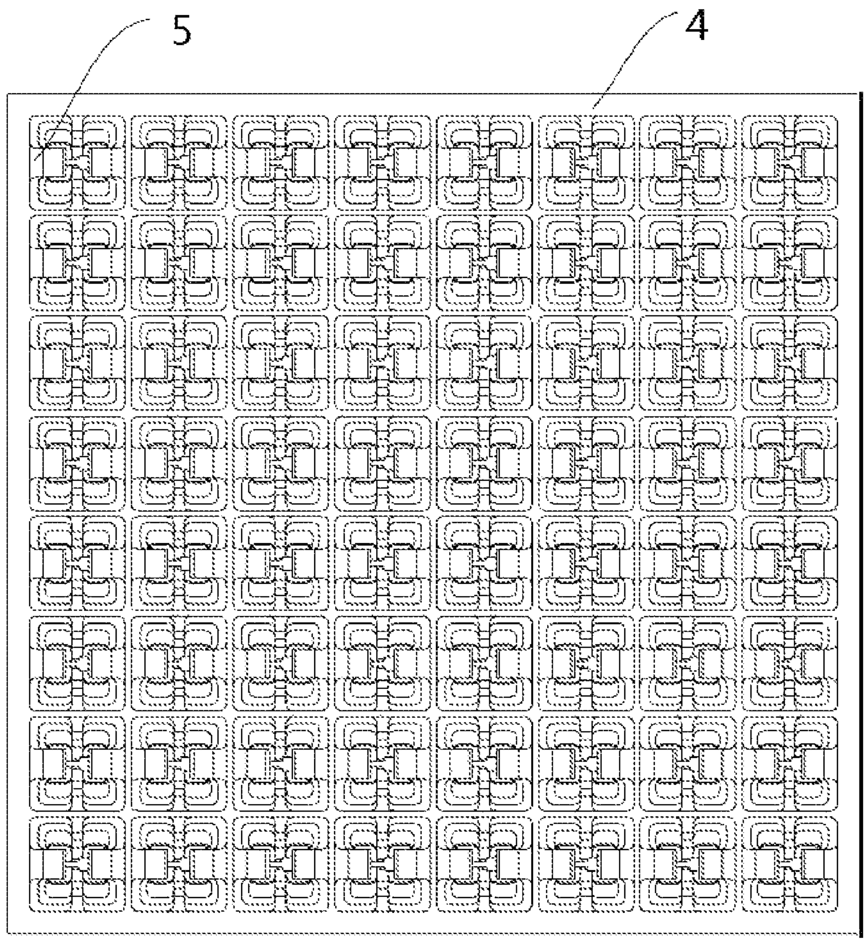
FIG. 7 is a top view of an overall structure of an all-metal dual-polarized panel antenna according to the present disclosure.
Figure 8:
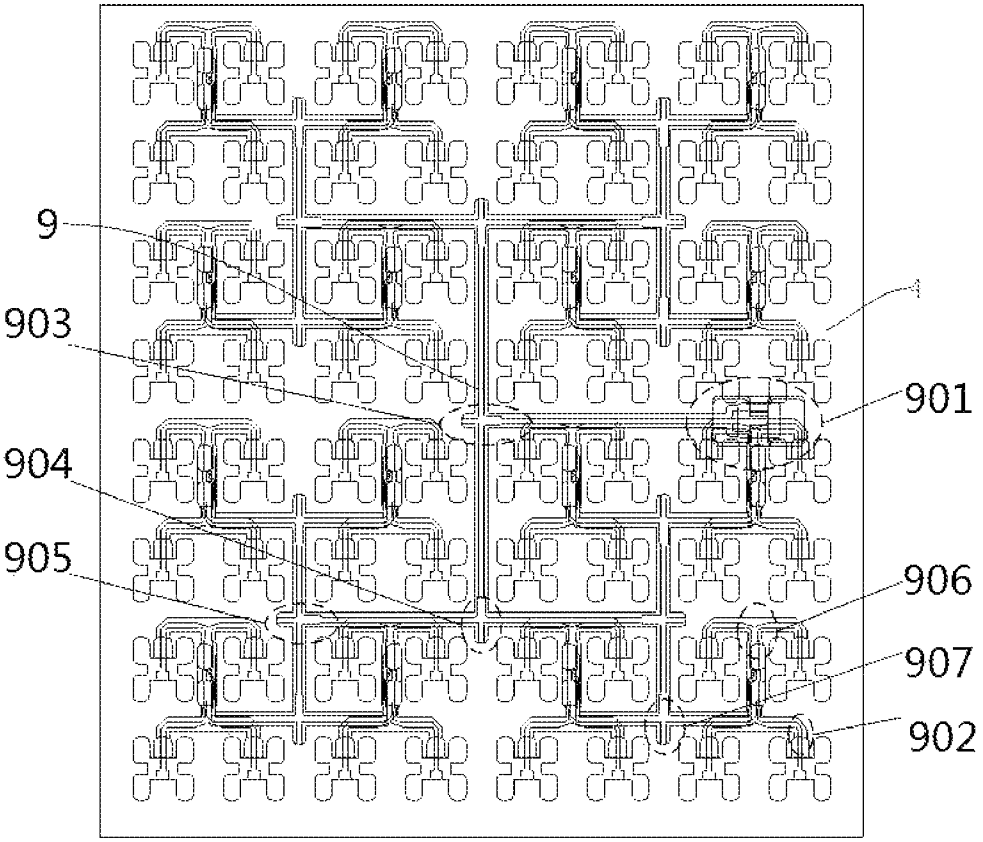
FIG. 8 is a top view of an overall structure in which a first polarization feeding network is provided on a third metal plate according to the present disclosure.

As shown in FIG. 6 to FIG. 8, the present disclosure provides an all-metal dual-polarized panel antenna, including a radiating network and a feeding network that are stacked sequentially from top to bottom.

The radiating network includes first metal plate 4 and a waveguide radiating port array on the first metal plate 4. The waveguide radiating port array includes M*N same waveguide radiating ports 5. The M*N same waveguide radiating ports 5 are distributed uniformly at intervals in M rows and N columns to form the waveguide radiating port array, where M and N denote an integer greater than or equal to 2, and * denotes a multiplicative operator.

The feeding network includes second metal plate 6, third metal plate 7, fourth metal plate 8, first polarization feeding network 9 on the second metal plate 6, second polarization feeding network 10 on the fourth metal plate 8, and the M*N same all-metal dual-polarized feeding elements according to Embodiment 1. The M*N same all-metal dual-polarized feeding elements form a quadruple-ridged waveguide array, a double-ridged waveguide to quadruple-ridged waveguide array, and a coaxial to double-ridged waveguide array.

The quadruple-ridged waveguide array is provided on the second metal plate 6. The quadruple-ridged waveguide array includes M*N same quadruple-ridged waveguide combiners 1. The M*N quadruple-ridged waveguide combiners 1 are distributed uniformly at intervals in M rows and N columns. The double-ridged waveguide to quadruple-ridged waveguide array is provided on the third metal plate 7. The double-ridged waveguide to quadruple-ridged waveguide array includes M*N same double-ridged waveguide to quadruple-ridged waveguide converters 2. The M*N double-ridged waveguide to quadruple-ridged waveguide converters 2 are distributed uniformly at intervals in M rows and N columns. The coaxial to double-ridged waveguide array is provided on the fourth metal plate 8. The coaxial to double-ridged waveguide array includes M*N same coaxial to double-ridged waveguide converters 3. The M*N coaxial to double-ridged waveguide converters 3 are distributed uniformly at intervals in M rows and N columns.

In the embodiment, the first polarization feeding network 9 includes a first one-to-M*N power divider. Fourth input port 901 and M*N third output ports 902 are arranged on the first one-to-M*N power divider. The M*N third output ports 902 face a first direction. The M*N third output ports 902 are coupled with first input ports 104 of the M*N quadruple-ridged waveguide combiners 1 in one-to-one correspondence.

The second polarization feeding network 10 includes a second one-to-M*N power divider. Fifth input port 1001 and M*N fourth output ports 1002 are arranged on the second one-to-M*N power divider. The M*N fourth output ports 1002 face a second direction. The M*N fourth output ports 1002 are coupled with third input ports 3021 of the M*N coaxial to double-ridged waveguide converters 3 in one-to-one correspondence.

In the embodiment, as shown in FIG. 6 to FIG. 7, the first metal plate 4 is a rectangular plate. A length direction of the first metal plate 4 is defined as a first direction, and a width direction is defined as a second direction. The first direction is perpendicular to the second direction. M*N waveguide radiating ports 5 are distributed uniformly at intervals in M rows and N columns to form the waveguide radiating port array. The waveguide radiating port array has a row direction along the first direction, and a column direction along the second direction. The waveguide radiating port array is configured to radiate an electromagnetic wave in the first polarization direction and an electromagnetic wave in the second polarization direction.

In the embodiment, as shown in FIG. 6 to FIG. 7, each waveguide radiating port 5 is realized through a hollow-out radiating slot in the first metal plate 4. An upper end surface of the waveguide radiating port 5 is flush with an upper end surface of the first metal plate 4, and a lower end surface of the radiating slot is flush with a lower end surface of the first metal plate 4. The radiating slot is a rectangular slot.

Figure 9:
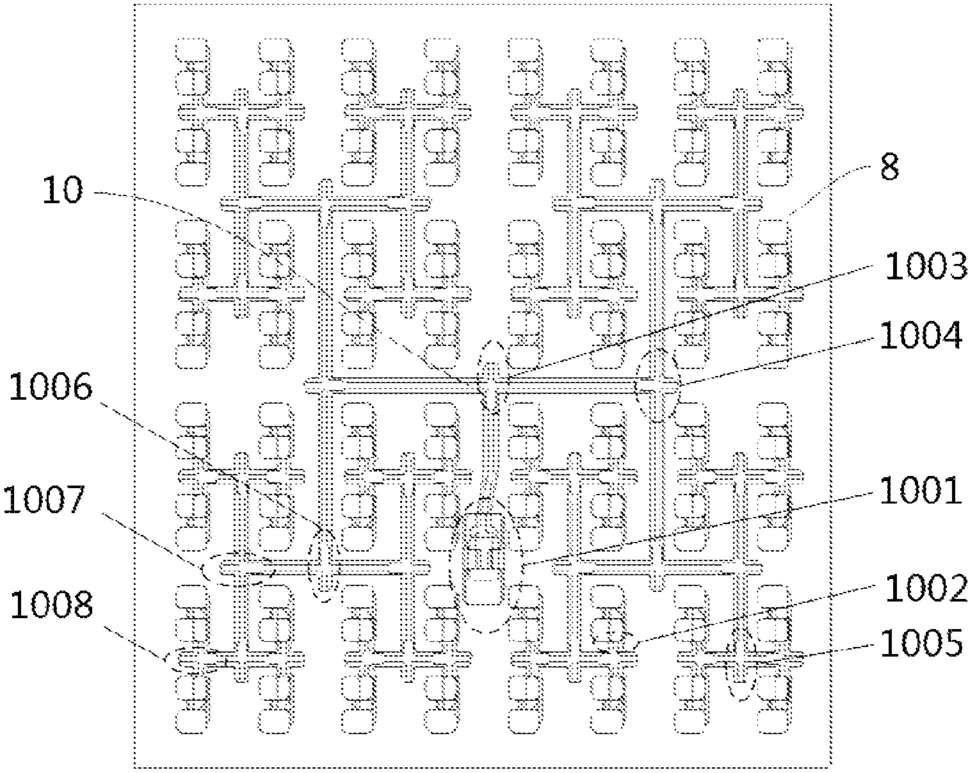
FIG. 9 is a top view of an overall structure in which a second polarization feeding network is provided on a fourth metal plate according to the present disclosure.

In the embodiment, as shown in FIG. 8 to FIG. 9, the feeding network includes second metal plate 6, third metal plate 7, fourth metal plate 8, first polarization feeding network 9, second polarization feeding network 10, and the M*N same all-metal dual-polarized feeding elements according to Embodiment 1. The second metal plate 6, the third metal plate 7 and the fourth metal plate 8 are a rectangular plate, with a length direction along the first direction, and a width direction along the second direction. The second metal plate 6, the third metal plate 7 and the fourth metal plate 8 are stacked sequentially from top to bottom. The second metal plate 6 is stacked under the first metal plate 4. The M*N same all-metal dual-polarized feeding elements form a quadruple-ridged waveguide array, a double-ridged waveguide to quadruple-ridged waveguide array, and a coaxial to double-ridged waveguide array.

In the embodiment, the quadruple-ridged waveguide array is provided on the second metal plate 6. The quadruple-ridged waveguide array is configured to match bandwidths and impedances of air and the feeding network. The quadruple-ridged waveguide array includes M*N same quadruple-ridged waveguide combiners 1. The M*N quadruple-ridged waveguide combiners 1 are distributed uniformly at intervals in M rows and N columns. The quadruple-ridged waveguide array has a row direction along the first direction, and a column direction along the second direction.

As mentioned above, the quadruple-ridged waveguide combiner 1 may be an integrally formed structure, and may also be a combined structure. In other words, in response to the integrally formed structure, upper first quadruple-ridged waveguide structural component 101 and lower second quadruple-ridged waveguide structural component 102 are integrally formed. In response to the combined structure, upper first quadruple-ridged waveguide structural component 101 and lower second quadruple-ridged waveguide structural component 102 are separated and independent components.

In the embodiment, the quadruple-ridged waveguide combiner 1 includes a plurality of independent quadruple-ridged waveguides that are stacked sequentially. An uppermost quadruple-ridged waveguide in the plurality of independent quadruple-ridged waveguides serves as the first quadruple-ridged waveguide structural component 101, and a lowest quadruple-ridged waveguide serves as the second quadruple-ridged waveguide structural component 102. Therefore, a flexibility of the design and a scenario expansion capability of the product can be improved. Since the quadruple-ridged waveguide combiner 1 includes a plurality of quadruple-ridged waveguides that are stacked sequentially from top to bottom, and each quadruple-ridged waveguide is provided with an input port and an output port. When the plurality of quadruple-ridged waveguides are stacked sequentially from top to bottom, the output port of each quadruple-ridged waveguide is located at an upper side, while the input port is located at a lower side. An input port of an upper quadruple-ridged waveguide is docked with an output port of an adjacent lower quadruple-ridged waveguide. An output port of the uppermost first quadruple-ridged waveguide structural component 101 serves as first output port 103 of the quadruple-ridged waveguide combiner 1. An input port of the lowest second quadruple-ridged waveguide structural component 102 serves as second input port 105 of the quadruple-ridged waveguide combiner 1. An opening is formed in a sidewall of the lowest second quadruple-ridged waveguide structural component 102. The opening serves as first input port 104 of the quadruple-ridged waveguide combiner 1. From bottom to top, periphery sizes of the plurality of quadruple-ridged waveguides increase gradually, and depths of ridges along the first direction and the second direction decrease gradually.

In the embodiment, as shown in FIG. 8, the first polarization feeding network 9 is provided on the second metal plate 6. The first polarization feeding network 9 includes a first one-to-M*N power divider. The first one-to-M*N power divider is provided with fourth input port 901 and M*N third output ports 902. The M*N third output ports 902 face the first direction. The M*N third output ports 902 of the first one-to-M*N power divider are coupled with first input ports 104 of the M*N quadruple-ridged waveguide combiners 1 in one-to-one correspondence.

In the embodiment, as shown in FIG. 8, the first one-to-M*N power divider includes a plurality of first polarization one-to-two power dividers in multiple stages. First-stage first polarization one-to-two power divider 903 divides a first polarized signal from the fourth input port 901 into two paths of the first polarized signal. The two paths of the first polarized signal are divided by second-stage first polarization one-to-two power divider 904 for a second time. Two paths of the first polarized signal obtained after second division are divided by third-stage first polarization one-to-two power divider 905 for a third time. Two paths of the first polarized signal obtained after third division are divided by fourth-stage first polarization one-to-two power divider 906 for a fourth time. Two paths of the first polarized signal obtained after fourth division are divided by fifth-stage first polarization one-to-two power divider 907 for a fifth time. The first polarized signal after sequentially divided by the multiple stages is input to the first input port 104 of the quadruple-ridged waveguide combiner 1 through the third output port 902. It is to be understood that a number of the first polarization one-to-two power dividers and a number of the stages can be selected freely according to a size and number of panel antenna arrays, and are not limited herein.

In the embodiment, the double-ridged waveguide to quadruple-ridged waveguide array is provided on the third metal plate 7. The double-ridged waveguide to quadruple-ridged waveguide array includes M*N same double-ridged waveguide to quadruple-ridged waveguide converters 2. The M*N double-ridged waveguide to quadruple-ridged waveguide converters 2 are distributed uniformly at intervals in M rows and N columns. The double-ridged waveguide to quadruple-ridged waveguide array has a row direction along the first direction, and a column direction along the second direction. Each double-ridged waveguide to quadruple-ridged waveguide converter 2 is provided with a double-ridged waveguide input port and a quadruple-ridged waveguide output port. Quadruple-ridged waveguide output ports of the M*N double-ridged waveguide to quadruple-ridged waveguide converters 2 are connected to second input ports 105 of the M*N quadruple-ridged waveguide combiners 1 in one-to-one correspondence. Each double-ridged waveguide to quadruple-ridged waveguide converter 2 allows the electromagnetic wave in the second polarization direction to pass through, but cuts off the electromagnetic wave in the first polarization direction.

In the embodiment, the coaxial to double-ridged waveguide array is provided on the fourth metal plate 8. The coaxial to double-ridged waveguide array includes M*N same coaxial to double-ridged waveguide converters 3. The M*N coaxial to double-ridged waveguide converters 3 are distributed uniformly at intervals in M rows and N columns. The coaxial to double-ridged waveguide array has a row direction along the first direction, and a column direction along the second direction. Each coaxial to double-ridged waveguide converter 3 has third input port 3021 and a double-ridged waveguide output port. Second double-ridged waveguide structural components 301 of the M*N coaxial to double-ridged waveguide converters 3 are connected to first double-ridged waveguide structural components 202 of the M*N double-ridged waveguide to quadruple-ridged waveguide converters 2 in one-to-one correspondence.

In the embodiment, as shown in FIG. 8, the second polarization feeding network 10 is provided on the fourth metal plate 8. The second polarization feeding network 10 includes a second one-to-M*N power divider. The second one-to-M*N power divider is provided with fifth input port 1001 and M*N fourth output ports 1002. The M*N fourth output ports 1002 of the second one-to-M*N power divider face the second direction. The M*N fourth output ports 1002 of the second one-to-M*N power divider are coupled with third input ports 3021 of the M*N coaxial to double-ridged waveguide converters 3 in one-to-one correspondence.

In the embodiment, the second one-to-M*N power divider includes a plurality of second polarization one-to-two power dividers in multiple stages. First-stage second polarization one-to-two power divider 1003 divides a second polarized signal from the fifth input port 1001 into two paths of the second polarized signal. The two paths of the second polarized signal are divided by second-stage second polarization one-to-two power divider 1004 for a second time. Two paths of the second polarized signal obtained after second division are divided by third-stage second polarization one-to-two power divider 1005 for a third time. Two paths of the second polarized signal obtained after third division are divided by fourth-stage second polarization one-to-two power divider 1006 for a fourth time. Two paths of the second polarized signal obtained after fourth division are divided by fifth-stage second polarization one-to-two power divider 1007 for a fifth time. Two paths of the second polarized signal obtained after fifth division are divided by sixth-stage second polarization one-to-two power divider 1008 for a sixth time. The second polarized signal after sequentially divided by the multiple stages is input to the second input port 105 of the quadruple-ridged waveguide combiner 1 through the fourth output port 901. It is to be understood that a number of the second polarization one-to-two power dividers and a number of the stages can be selected freely according to a size and number of panel antenna arrays, and are not limited herein.

The all-metal dual-polarized panel antenna provided by the present disclosure has a following working process:

When an electromagnetic wave is input from the fourth input port 901 of the first one-to-M*N power divider, the first one-to-M*N power divider divides the electromagnetic wave accessed by the input port into M*N paths of the electromagnetic wave in the first polarization direction, and outputs the M*N paths of the electromagnetic wave in the first polarization direction to the first input ports 104 of the M*N quadruple-ridged waveguide combiners 1 in one-to-one correspondence through the M*N output ports. The M*N quadruple-ridged waveguide combiners 1 transmit signals accessed by the first input ports 104. Since the double-ridged waveguide to quadruple-ridged waveguide converters 2 cut off the electromagnetic wave in the first polarization direction, the electromagnetic wave in the first polarization direction can only be transmitted by the quadruple-ridged waveguide array. After passing through the M*N quadruple-ridged waveguide combiners 1, M*N paths of the electromagnetic wave in the first polarization direction are transmitted to the M*N waveguide radiating ports 5 through the first output ports 103 of the M*N quadruple-ridged waveguide combiners 1. The M*N waveguide radiating ports 5 radiate an accessed electromagnetic wave in the first polarization direction.

When an electromagnetic wave is input from the fifth input port 1001 of the second one-to-M*N power divider, the second one-to-M*N power divider divides the electromagnetic wave accessed by the fifth input port 1001 into M*N paths of the electromagnetic wave in the second polarization direction, and outputs the M*N paths of the electromagnetic wave in the second polarization direction to the third input ports 3021 of the M*N coaxial to double-ridged waveguide converters 3 in one-to-one correspondence through the M*N output ports. The coaxial to double-ridged waveguide converters transmit the electromagnetic wave to the double-ridged waveguide input ports of the M*N double-ridged waveguide to quadruple-ridged waveguide converters 2 through the double-ridged waveguide output ports. Since the double-ridged waveguide to quadruple-ridged waveguide converters 2 only allow the electromagnetic wave in the second polarization direction to pass through, the M*N double-ridged waveguide to quadruple-ridged waveguide converters 2 transmit an accessed electromagnetic wave in the second polarization direction to the M*N waveguide radiating ports 5 through the quadruple-ridged waveguide output ports. The M*N waveguide radiating ports 5 radiate an accessed second polarized electromagnetic wave.

Figure 10:
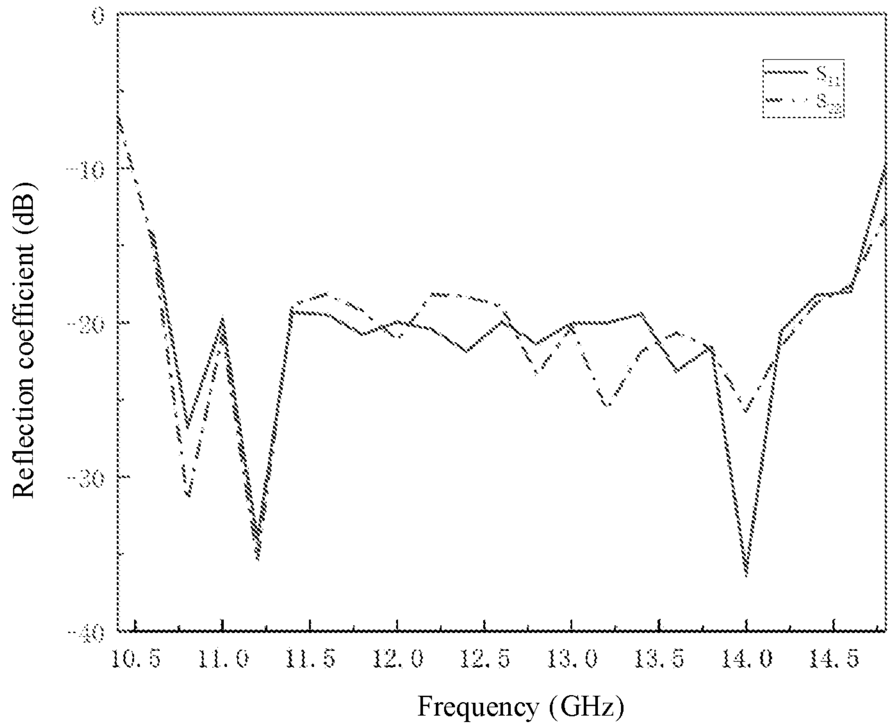
FIG. 10 is a simulation diagram of a reflection coefficient for an all-metal dual-polarized panel antenna according to an embodiment.
Figure 11:
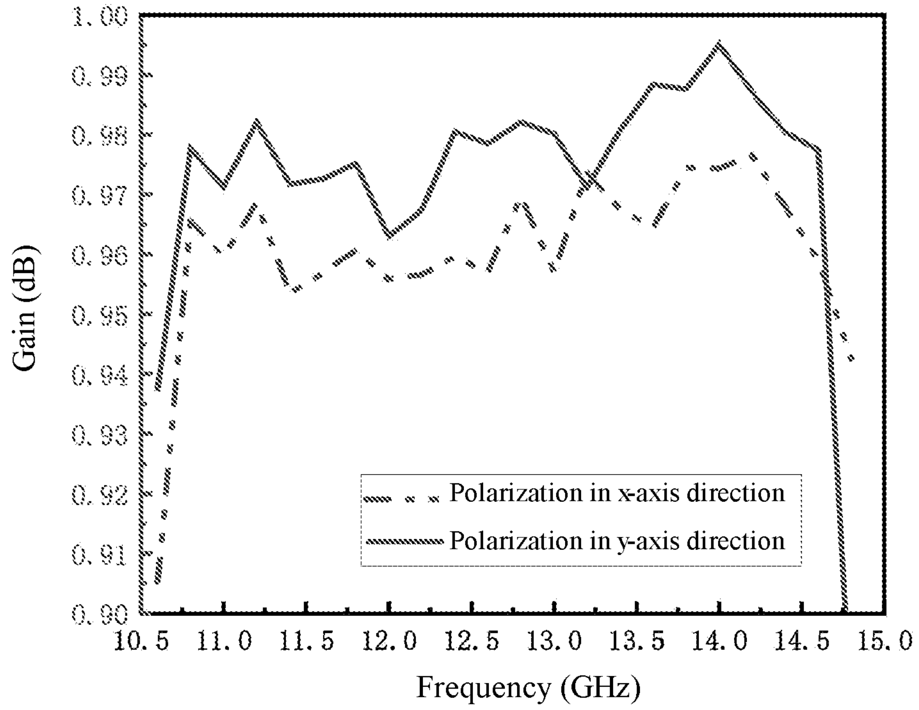
FIG. 11 is a simulation diagram of a polarization efficiency in an x-axis direction and a polarization efficiency in a y-axis direction for an all-metal dual-polarized panel antenna according to an embodiment.
Figure 12:
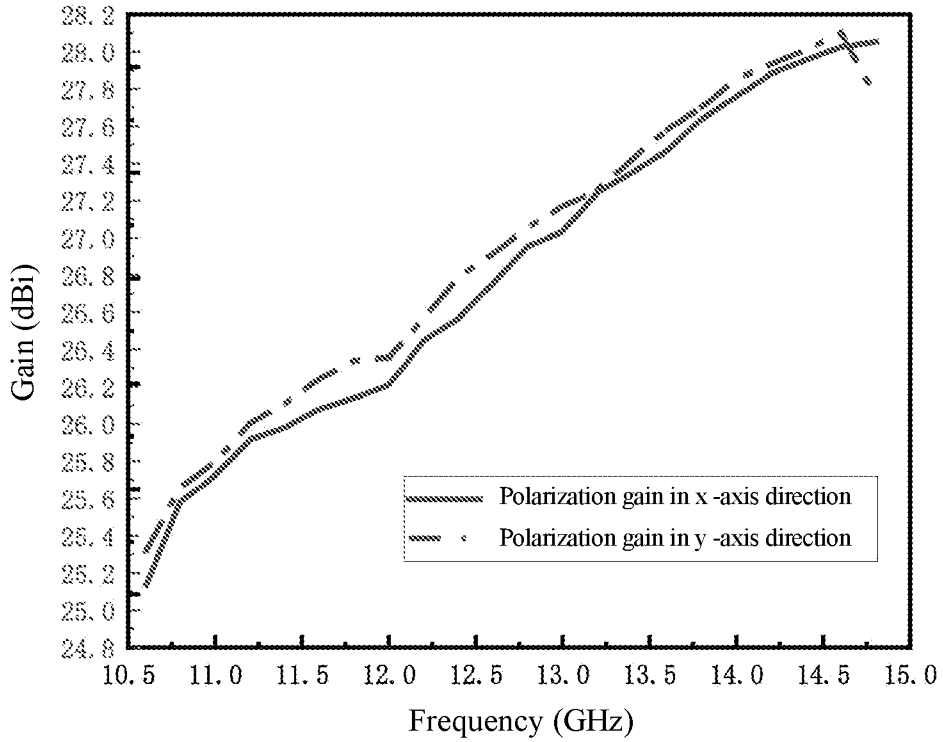
FIG. 12 is a simulation diagram of gains of a polarized electromagnetic wave in an x-axis direction and a polarized electromagnetic wave in a y-axis direction for an all-metal dual-polarized panel antenna according to an embodiment.

In the embodiment, in order to verify excellent performance of the all-metal dual-polarized panel antenna of the present disclosure, when M is 8 and N is 8, a high frequency structure simulator (HFSS) simulation software is used to simulate the all-metal dual-polarized panel antenna of the present disclosure. The simulation diagram of a reflection coefficient for the all-metal dual-polarized panel antenna of the present disclosure is as shown in FIG. 10. The simulation diagram of a polarization efficiency in the first direction and a polarization efficiency in the second direction for the all-metal dual-polarized panel antenna of the present disclosure is as shown in FIG. 11. The simulation diagram of gains of a polarized electromagnetic wave in the first direction and a polarized electromagnetic wave in the second direction for the all-metal dual-polarized panel antenna of the present disclosure is as shown in FIG. 12. It is to be noted that the polarization in the first direction refers to polarization in an x-axis direction, and the polarization in the second direction refers to polarization in a y-axis direction in FIG. 10 to FIG. 12.

In the embodiment, for FIG. 10, $S_{11}$ denotes a reflection coefficient (dB) of the input port of the first polarization feeding network 9, and $S_{22}$ denotes a reflection coefficient (dB) of the input port of the second polarization feeding network 10. As can be seen from FIG. 10, the reflection coefficients (dB) of the two input ports are less than −10 dB within a frequency range of 10.7 GHz to 14.5 GHz (which is 30% greater than the bandwidth). Therefore, the all-metal dual-polarized panel antenna provided by the present disclosure has the wide bandwidth.

In the embodiment, for FIG. 11, the polarization in the first direction refers to polarization in an x-axis direction, and the polarization in the second direction refers to polarization in a y-axis direction. The polarization efficiency in the first direction and the polarization efficiency in the second direction are greater than 90% within a frequency range of 10.7 GHz to 14.5 GHz. Particularly, the polarization efficiency in the first direction and the polarization efficiency in the second direction are greater than 95% within the frequency range of 10.7 GHz to 14.5 GHz. Therefore, the all-metal dual-polarized panel antenna provided by the present disclosure has the high efficiency.

In the embodiment, for FIG. 12, the polarization in the first direction refers to a polarization gain in an x-axis direction, and the polarization in the second direction refers to a polarization gain in a y-axis direction. The polarization gain in the first direction and the polarization gain in the second direction are greater than 25 dBi within a frequency range of 10.7 GHz to 14.5 GHz. Therefore, the all-metal dual-polarized panel antenna provided by the present disclosure has the high gain.

As can be seen from simulated data in FIG. 10 to FIG. 12, the all-metal dual-polarized panel antenna provided by the present disclosure has advantages of the wide bandwidth, high efficiency and low profile.

What is claimed is:

1. An all-metal dual-polarized feeding element, comprising a quadruple-ridged waveguide combiner, a double-ridged waveguide to quadruple-ridged waveguide converter, and a coaxial to double-ridged waveguide converter that are stacked sequentially from top to bottom and are coupled, wherein the quadruple-ridged waveguide combiner is formed by stacking multiple quadruple-ridged-waveguides sequentially from top to bottom; the quadruple-ridged waveguide combiner is a step tapered structure in size from top to bottom; the quadruple-ridged waveguide combiner transmits electromagnetic waves in dual polarization directions; and the double-ridged waveguide to quadruple-ridged waveguide converter and the coaxial to double-ridged waveguide converter transmit an electromagnetic wave in a same single polarization direction for the electromagnetic waves in the dual polarization directions.

2. The all-metal dual-polarized feeding element according to claim 1, wherein the quadruple-ridged waveguide combiner is an integrally formed structure; or the quadruple-ridged waveguide combiner is a separated structure.

3. The all-metal dual-polarized feeding element according to claim 2, wherein in response to the separated structure, the quadruple-ridged waveguide combiner comprises a plurality of quadruple-ridged waveguide structural components that are stacked sequentially and are independent; and a periphery size of an uppermost first quadruple-ridged waveguide structural component is greater than a periphery size of a lowest second quadruple-ridged waveguide structural component; a bottom of the second quadruple-ridged waveguide structural component comes in contact with a top of the double-ridged waveguide to quadruple-ridged waveguide converter; and a bottom size of the second quadruple-ridged waveguide structural component is matched with a top size of the double-ridged waveguide to quadruple-ridged waveguide converter.

4. The all-metal dual-polarized feeding element according to claim 3, wherein the quadruple-ridged waveguide structural components each comprise a lower input port and an upper output port, and an input port of an upper quadruple-ridged waveguide structural component is docked with an output port of an adjacent lower quadruple-ridged waveguide structural component;

an output port of the uppermost first quadruple-ridged waveguide structural component serves as a first output port of the quadruple-ridged waveguide combiner, and the first output port serves as an output port of the all-metal dual-polarized feeding element; and a first input port of the quadruple-ridged waveguide combiner is provided on a sidewall between two ridges of the lowest second quadruple-ridged waveguide structural component; an input port of the lowest second quadruple-ridged waveguide structural component serves as a second input port of the quadruple-ridged waveguide combiner; and a phase difference between polarization directions of the first input port and the second input port is 90°.

5. The all-metal dual-polarized feeding element according to claim 4, wherein the double-ridged waveguide to quadruple-ridged waveguide converter comprises an upper third quadruple-ridged waveguide structural component and a lower first double-ridged waveguide structural component; and the third quadruple-ridged waveguide structural component and the first double-ridged waveguide structural component are stacked and coupled; a top of the third quadruple-ridged waveguide structural component comes in contact with the bottom of the second quadruple-ridged waveguide structural component- and the first double-ridged waveguide structural component is coupled with the coaxial to double-ridged waveguide converter.

6. The all-metal dual-polarized feeding element according to claim 5, wherein the first double-ridged waveguide structural component is a dumbbell-like waveguide structure; a size of each of first end waveguide components at two ends of the first double-ridged waveguide structural component is greater than a size of a first middle waveguide structural component at a middle of the first double-ridged waveguide structural component; and the first end waveguide components at the two ends of the first double-ridged waveguide structural component are coupled with the first middle waveguide structural component at the middle of the first double-ridged waveguide structural component.

7. The all-metal dual-polarized feeding element according to claim 6, wherein the coaxial to double-ridged waveguide converter comprises a second double-ridged waveguide structural component morphologically matched and coupled with the first double-ridged waveguide structural component and a coaxial input waveguide coupled with the second double-ridged waveguide structural component; and a third input port and a second output port having a greater size than the third input port are arranged on the coaxial input waveguide; and the second output port is coupled with a side of the second double-ridged waveguide structural component.

8. The all-metal dual-polarized feeding element according to claim 7, wherein ridges of the quadruple-ridged waveguide combiner, the double-ridged waveguide to quadruple-ridged waveguide converter, and the coaxial to double-ridged waveguide converter are a chamfer and use an all-metal structure.

9. An all-metal dual-polarized panel antenna, comprising a radiating network and a feeding network that are stacked sequentially from top to bottom, wherein the radiating network comprises a first metal plate and a waveguide radiating port array on the first metal plate; the waveguide radiating port array comprises M*N same waveguide radiating ports; and the M*N same waveguide radiating ports are distributed uniformly at intervals in M rows and N columns to form the waveguide radiating port array, wherein M and N denote an integer greater than or equal to 2, and * denotes a multiplicative operator;

the feeding network comprises a second metal plate, a third metal plate, a fourth metal plate, a first polarization feeding network on the second metal plate, a second polarization feeding network on the fourth metal plate, and the M*N same all-metal dual-polarized feeding elements according to claim 1; and the M*N same all-metal dual-polarized feeding elements form a quadruple-ridged waveguide array, a double-ridged waveguide to quadruple-ridged waveguide array, and a coaxial to double-ridged waveguide array; and the quadruple-ridged waveguide array is provided on the second metal plate; the quadruple-ridged waveguide array comprises M*N same quadruple-ridged waveguide combiners; the M*N quadruple-ridged waveguide combiners are distributed uniformly at intervals in M rows and N columns; the double-ridged waveguide to quadruple-ridged waveguide array is provided on the third metal plate; the double-ridged waveguide to quadruple-ridged waveguide array comprises M*N same double-ridged waveguide to quadruple-ridged waveguide converters; the M*N double-ridged waveguide to quadruple-ridged waveguide converters are distributed uniformly at intervals in M rows and N columns; the coaxial to double-ridged waveguide array is provided on the fourth metal plate; the coaxial to double-ridged waveguide array comprises M*N same coaxial to double-ridged waveguide converters; and the M*N coaxial to double-ridged waveguide converters are distributed uniformly at intervals in M rows and N columns.

10. The all-metal dual-polarized panel antenna according to claim 9, wherein the first polarization feeding network comprises a first one-to-M*N power divider; a fourth input port and M*N third output ports are arranged on the first one-to-M*N power divider; the M*N third output ports face a first direction; and the M*N third output ports are coupled with first input ports of the M*N quadruple-ridged waveguide combiners in one-to-one correspondence; and the second polarization feeding network comprises a second one-to-M*N power divider; a fifth input port and M*N fourth output ports are arranged on the second one-to-M*N power divider; the M*N fourth output ports face a second direction; and the M*N fourth output ports are coupled with third input ports of the M*N coaxial to double-ridged waveguide converters in one-to-one correspondence, the first direction is perpendicular to the second direction.

11. The all-metal dual-polarized panel antenna according to claim 9, wherein each of the M*N same quadruple-ridged waveguide combiners is an integrally formed structure; or each of the M*N same quadruple-ridged waveguide combiner is a separated structure.

12. The all-metal dual-polarized panel antenna according to claim 11, wherein in response to the separated structure, each of the M*N same quadruple-ridged waveguide combiners comprises a plurality of quadruple-ridged waveguide structural components, the plurality of quadruple-ridged waveguide structural components are stacked sequentially and are independent; and a periphery size of an uppermost first quadruple-ridged waveguide structural component is greater than a periphery size of a lowest second quadruple-ridged waveguide structural component; a bottom of the lowest second quadruple-ridged waveguide structural component comes in contact with a top of one of the M*N same double-ridged waveguide to quadruple-ridged waveguide converters; and a bottom size of the lowest second quadruple-ridged waveguide structural component is matched with a top size of the one of the M*N same double-ridged waveguide to quadruple-ridged waveguide converters.

13. The all-metal dual-polarized panel antenna according to claim 12, wherein each of the plurality of quadruple-ridged waveguide structural components comprises a lower input port and an upper output port, and an input port of an upper quadruple-ridged waveguide structural component is docked with an output port of an adjacent lower quadruple-ridged waveguide structural component;

an output port of the uppermost first quadruple-ridged waveguide structural component serves as a first output port of each of the M*N same quadruple-ridged waveguide combiners, and the first output port serves as an output port of the all-metal dual-polarized feeding element; and a first input port of each of the M*N same quadruple-ridged waveguide combiners is provided on a sidewall between two ridges of the lowest second quadruple-ridged waveguide structural component; an input port of the lowest second quadruple-ridged waveguide structural component serves as a second input port of each of the M*N same quadruple-ridged waveguide combiners; and a phase difference between polarization directions of the first input port and the second input port is 90°.

14. The all-metal dual-polarized panel antenna according to claim 13, wherein each of the M*N same double-ridged waveguide to quadruple-ridged waveguide converters comprises an upper third quadruple-ridged waveguide structural component and a lower first double-ridged waveguide structural component; and the upper third quadruple-ridged waveguide structural component and the lower first double-ridged waveguide structural component are stacked and coupled; a top of the upper third quadruple-ridged waveguide structural component comes in contact with the bottom of the lowest second quadruple-ridged waveguide structural component and the lower first double-ridged waveguide structural component is coupled with one of the M*N same coaxial to double-ridged waveguide converters.

15. The all-metal dual-polarized panel antenna according to claim 14, wherein the lower first double-ridged waveguide structural component is a dumbbell-like waveguide structure; a size of each of first end waveguide components at two ends of the lower first double-ridged waveguide structural component is greater than a size of a first middle waveguide structural component at a middle of the lower first double-ridged waveguide structural component; and the first end waveguide components at the two ends of the first double-ridged waveguide structural component are coupled with the first middle waveguide structural component at the middle of the first double-ridged waveguide structural component.

16. The all-metal dual-polarized panel antenna according to claim 15, wherein each of the M*N same coaxial to double-ridged waveguide converters comprises a second double-ridged waveguide structural component morphologically matched and coupled with the lower first double-ridged waveguide structural component and a coaxial input waveguide coupled with the second double-ridged waveguide structural component; and a third input port and a second output port having a greater size than the third input port are arranged on the coaxial input waveguide; and the second output port is coupled with a side of the second double-ridged waveguide structural component.

17. The all-metal dual-polarized panel antenna according to claim 16, wherein ridges of each of the M*N same quadruple-ridged waveguide combiners, each of the M*N same double-ridged waveguide to quadruple-ridged waveguide converters, and each of the M*N same coaxial to double-ridged waveguide converters are a chamfer and use an all-metal structure.

* * * * *